United States Patent [19]

Buzzell

[11] 4,045,738
[45] Aug. 30, 1977

[54] VARIABLE RELUCTANCE SPEED SENSOR OF INTEGRAL CONSTRUCTION UTILIZING A SHIELDED HIGH COERCIVE FORCE RARE EARTH MAGNET POSITIONED DIRECTLY ADJACENT THE SENSING ROTATING ELEMENT

[75] Inventor: Colby E. Buzzell, Wilmington, Mass.

[73] Assignee: General Electric Company, Wilmington, Mass.

[21] Appl. No.: 665,047

[22] Filed: Mar. 8, 1976

[51] Int. Cl.² ............................................... G01P 3/48
[52] U.S. Cl. .................................... 324/174; 335/229; 335/302; 324/42
[58] Field of Search ................. 324/174, 42, 48, 34 R, 324/34 PS, 6 T, 6 D, 41; 335/216, 229, 302, 289; 336/110; 148/100, 101

[56] References Cited

U.S. PATENT DOCUMENTS

| | | | |
|---|---|---|---|
| 3,633,138 | 1/1972 | Baermann | 335/302 X |
| 3,671,893 | 6/1972 | Edgar et al. | 335/179 |
| 3,826,985 | 7/1974 | Wiley | 324/174 X |
| 3,881,127 | 4/1975 | MacMaster et al. | 335/229 X |
| 3,929,519 | 12/1975 | Benz | 148/31.57 |

OTHER PUBLICATIONS

Measurement of Magnetic Properties of Cobalt-Rare Earth Permanent Magnets, M. G. Benz & D. Luther Martin, IEEE Trans. on Magnetics, vol. Mag. 7, No. 2, June 1971, pp. 285-291.

Primary Examiner—Rudolph V. Rolinec
Assistant Examiner—Vincent J. Sunderdick

[57] ABSTRACT

A compact, highly efficient, integral construction for a speed sensor is described which, in a preferred embodiment, utilizes a cup shaped magnetically soft body or housing as an integral core, sheath and flux return path for a rare earth permanent magnet. A reentrant center post is positioned within the cup shaped sensor housing and a thin disc shaped, rare earth permanent magnet is secured to the free end of the center post. The magnet is thus positioned directly adjacent to a rotating toothed gear, the speed of which is to be sensed but is shielded magnetically from extraneous magnetic effects because it is positioned in the housing. As the toothed wheel rotates past the magnet, the reluctance of the magnetic path varies with the varying air gap. The flux level generated by the thin magnet varies correspondingly and an AC signal is generated in a coil mounted on the center post. By positioning the high coercive force, rare earth magnet directly adjacent to the wheel and providing a direct return path from the wheel teeth to the sidewalls of the cup shaped housing the magnet, a very compact and efficient construction is made possible.

9 Claims, 4 Drawing Figures

U.S. Patent  Aug. 30, 1977  4,045,738
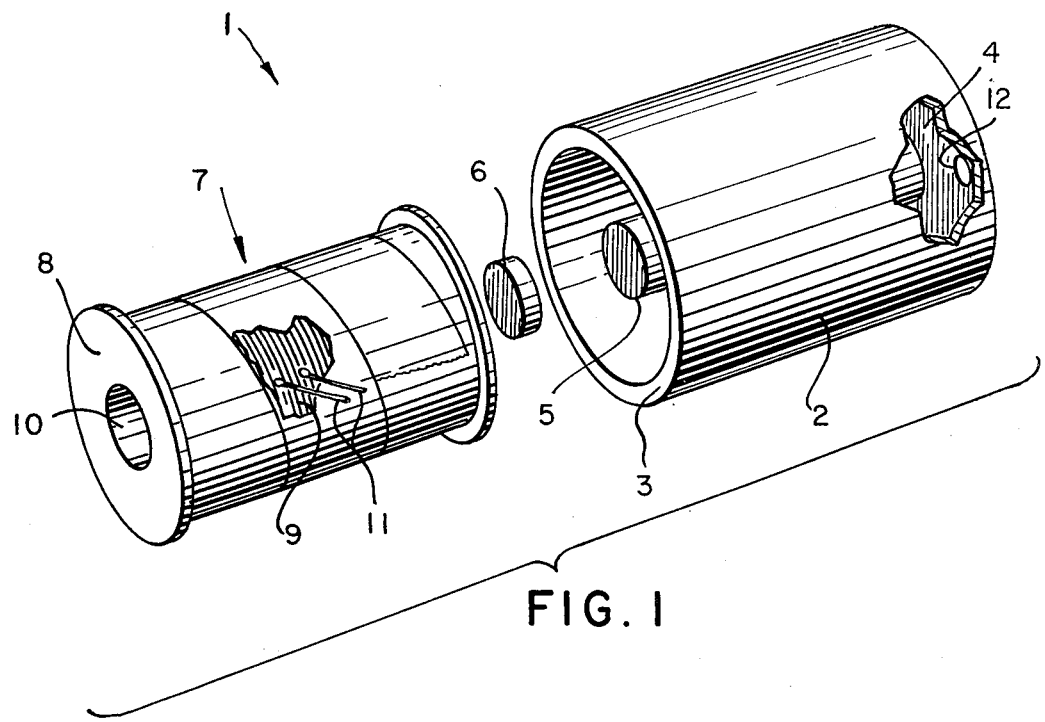
FIG. 1
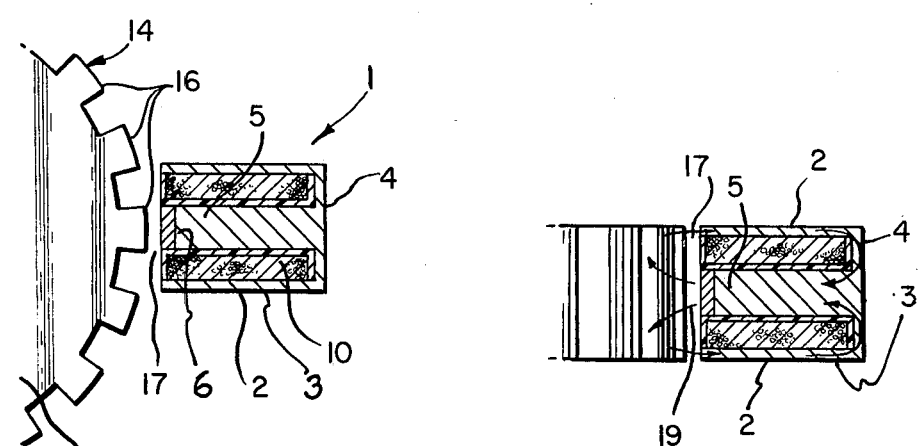
FIG. 2
FIG. 3
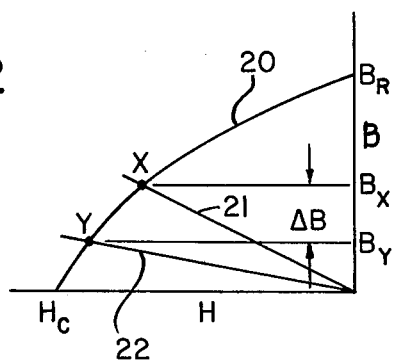
FIG. 4

VARIABLE RELUCTANCE SPEED SENSOR OF INTEGRAL CONSTRUCTION UTILIZING A SHIELDED HIGH COERCIVE FORCE RARE EARTH MAGNET POSITIONED DIRECTLY ADJACENT THE SENSING ROTATING ELEMENT

This invention relates to a variable reluctance speed sensor and more particularly, to a small, compact, integrally constructed sensing head utilizing a shielded high energy, rare earth permanent magnet.

Variable reluctance speed sensors for measuring the speed of a rotating device are well-known and have been in use for many years. Such prior art variable reluctance speed sensors, a typical version of which is shown in FIG. 6 of U.S. Pat. No. 3,614,615 entitled "Railway Vehicle Speed Indicating System," include a permanent magnet which is attached to one end of an elongated core made of a soft magnetic material which projects outwardly from the magnet toward a rotating member. The permanent magnet produces a field which drives flux through the core and across the air gap between the end of the core and a toothed wheel or other body. As the wheel rotates, the reluctance of the magnetic circuit varies as the teeth pass by the core. Thus, the core field is modulated producing an AC voltage in a coil positioned around the core with the frequency of the voltage being directly related to the speed of the exciter wheel.

Variable reluctance speed sensors of the type just described and shown in the aforementioned patent, suffer from a number of shortcomings which limit the utility of these devices. One of the shortcomings is that with hitherto availabe permanent magnetic materials such as iron, cobalt, nickel alloys, of the type sold under the trade designation "ALNICO" or cobalt steels, or platinum-cobalt alloys or chrome steels, the sensor permanent magnet has to be fairly large in order to drive enough flux through the core and across the air gap to produce an adequate output signal. Consequently, these prior art variable reluctance speed sensors tend to be long. For certain space limited applications, such as on aircraft engines, this can be a definite handicap.

In addition, because of a fairly long core is attached to a fairly long magnet, use of the sensor in a vibratory environment can present problems since vibration introduces stresses on the long cantilevered core resulting in poor mechanical coupling between the magnet and the core. This introduces additional air gaps into the magnet path and often results in significant vibration induced output errors. Similarly, thermal expansion stresses can also produce poor mechanical coupling between the magnet and core which results in an increase in the reluctance (or conversely a decrease in the permeance) of the magnetic circuit. Thus, if the sensor is to be used in a high temperature environment such as a jet aircraft where the temperature level is typically 400° to 500° F, there can be substantial problems which require care both in the design and in assembly and manufacture of the sensor to minimize stresses due to thermal expansion so that integrity of the joint between the magnet and the core is maintained.

Yet another problem often encountered with prior art, variable reluctance sensing devices is their sensitivity to any ferromagnetic materials in the vicinity of the sensor. That is, prior art devices normally have an air return path in the sense that the return flux either comes directly through air or through a non-ferromagnetic sheathing (which is the magnetic equivalent of air). Hence, problems are encountered whenever the sensor has to be mounted near anything which is made of a ferromagnetic material. When the sensor is located near such a ferromagnetic material, the ferromagnetic material acts as a flux shorting mechanism thereby diverting the flux from the sensing magnetic path and introducing errors into the reading by affecting and degrading the output sensitivity.

Furthermore, many of the permanent magnetic materials hitherto available have fairly low coercive forces, i.e., the force required to demagnetize the material is low. The design of the sensors in terms of air gaps, magnet diameters and length, is therefore quite critical to avoid inadvertent "knockdown" or demagnetization of the magnet.

Consequently, a need exists for an improved, variable reluctance sensor which is small and compact, which is not susceptible to thermal expansion and vibration induced mechanical stresses and which, at the same time, provides inherent self-shielding so that ferromagnetic materials is the vicinity of the sensor have no measurable effect on performance.

Applicant has found that all of these desirable qualities and characteristics may be provided in a sensor configuration which uses a thin, (i.e., diameter> length) disc shaped rare earth, permanent magnet positioned in a housing of magnetically soft material which surrounds the magnet and acts as an integral, core, sheath and flux return structure. By virtue of this configuration, a closely controlled flux return path is established which has the advantage of shielding the permanent magnet from the effects of extraneous ferromagnetic materials.

It is therefore a principal purpose of the instant application to provide a variable reluctance, speed sensor which provides an integral, magnetically shielded housing structure for the permanent magnet.

Yet another objective of the invention is to provide a small, compact variable reluctance, sensor which is simple in construction, and is not subject to thermal and vibration induced mechanical problems.

Yet another objective of the invention is to provide a variable reluctance, speed sensor having a high energy magnet positioned directly adjacent to the rotating member.

Yet another objective of the invention is to provide a variable reluctance, speed sensor having an integral core and flux return construction to shield the permanent magnet forming part of the sensor from external fields.

Yet another objective of the invention will become apparent as the description thereof proceeds.

The various advantages of the instant invention are realized, in a preferred embodiment thereof, in a construction comprising a cup shaped, integral sensor housing formed of a magnetically soft material. A reentrant center post, concentric with the outer walls of the housing, extends from the base of the housing. A thin, disc shaped, rare earth, permanent magnet, such as samarium cobalt, for example, is firmly affixed to the outer or free end of the post. The rare earth permanent magnet is thus positioned directly adjacent to a toothed exciter wheel which is attached to the object, the speed of which is to be measured. A sensing coil is positioned around the center post and a voltage is induced in the coil as the teeth or lobes of the exciter wheel rotate past the rare earth magnet. The outer walls of the housing which surround the center post and the magnet, provide a magnetic return path for the flux passing from the magnet across the air gap and into the exciter wheel. The housing thus shields the permanent magnet so that external magnetic fields or the presence of extraneous ferromagnetic materials near the sensor have no measurable effect on the output of the sensor. By use of a rare earth magnet and the integral housing structure, a very small, compact, highly sensitive variable speed sensor configuration is made possible.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

FIG. 1 is an exploded, perspective view of the integral speed sensor head.

FIG. 2 is a schematic view, partially in section, of the variable reluctance speed sensor head and the toothed exciter wheel.

FIG. 3 is a plan view of the exciter wheel and the sensor head and, schematically, shows the flux path and flux distribution of the speed sensor.

FIG. 4 shows the demagnetization curve for a magnet of the type utilized in the speed sensor and is useful in understanding the operation of the invention.

FIG. 1 shows an exploded, perspective view of the sensor head which cooperates with a toothed wheel constructed of a magnetically soft body, not shown in FIG. 1, to produce an output signal proportional to the speed of the wheel. The sensing head shown generally at 1, includes a cup shaped housing made of a magnetically soft material. The term magnetically soft material includes any shaped piece of ferromagnetic material which, once having been magnetized, is very easily demagnetized, i.e., once magnetized, only a slight coercive force is required to remove the resultant magnetism in the material. The cup shaped housing 2 includes a cylindrical outer wall 3, a base 4 and a reentrant center post 5 which is integral with base and sidewalls of the housing 1. Center post 5 is concentric with outer wall 3, and as will be described later, supports both a permanent magnet as well as a coil which is wound on a bobbin which fits around the center post. A voltage is induced in the coil as the flux passing through the center post changes with movement of a toothed wheel associated with the sensor head. Center post 5 is slightly shorter than outer wall 3 in order to allow sufficient space for mounting a thin, disc shaped, high energy rare earth magnet shown generally at 6. Disc magnet 6 is securely attached to the end of the center post either by brazing or by means of a high temperature, structural adhesive such as that manufactured and sold by the Loctite Corporation under its trade designation "Loctite." Magnet 6 is preferably a rare earth magnet such as samarium cobalt which has a coercive force ($H_c$) in the order of 8,000 oersteds. Because of the high coercive force which is characteristic of rare earth magnets, and the corresponding high energy products such magnets have, a very thin, disc magnet, i.e., one in which the diameter is greater than the length so that the ratio L/D < 1/3 is used. It has been found that a magnet having a thickness of several hundredths of an inch is all that is required to drive flux across the air gap and produce a useful signal in the sensor output coil.

A sensing coil is shown generally at 7 and consists of an insulating bobbin 8 which supports a winding 9. Bobbin 8 has a central passage or opening 10 which is slightly larger than the diameter of center post 5. This allows the bobbin to be mounted on post 5 when the sensor is in the assembled state and one end of bobbin 8 is fastened to base 4 by an adhesive such as "Loctite." Output leads 11 from winding 9 pass through an opening 12 in the base of the housing 2 to bring the coil leads to the exterior of the sensing head for connection to a suitable remote signal processing and display circuit.

It will be understood that the bobbin may be dispensed with and the winding placed directly on the core over an intervening insulating layer. Because housing 2 consists of a soft magnetic material, it can be seen that outer wall 3 provides return path for flux driven across the air gap and into a moving member such as toothed exciter wheel, not shown. Since the outer housing is in close proximity to and effectively surrounds center post 5 and permanent magnet 6 on all sides but that exposed to exciter wheel, it will also be apparent that the permanent magnet is shielded from the influence of any magnetic materials or fields positioned outside or adjacent to the housing and any such magnetic materials will have no effect on the sensor.

FIG. 2 shows the sensor head 1 positioned adjacent to a toothed exciter wheel 14 which is attached to and driven by a moving member, the speed of which is to be sensed. Wheel 14 is fabricated from a magnetically soft material and consists of a main body 15 and a plurality of teeth or lobes 16. Permanent magnet 6, which is fixed to the free end of center post 5, is thus positioned adjacent to wheel 14 so that a small air gap 17 exists between the permanent magnet and exciter wheel 14. Coil 10 which is positioned on and surrounds center post 5 has a voltage induced therein which is proportional to the reluctance (or, conversely the permeance) of the magnetic path consisting of permanent magnet 6, air gap 17, exciter wheel 14, sidewalls 3, base 4 and center post 5 which constitute the magnetic return path for the flux driven across the air gap by magnet 6.

As can be seen in FIG. 3 which is a plan view of the sensing head and the wheel, the magnetic flux shown by the arrows 19 passes across the air gap 17 into wheel 14 and then back across the air gap into sidewalls 3 and then through base 4 and center post 5 back to the permanent magnet 6. Since the sensor head forms an integral magnetic return path and surrounds the center post and the permanent magnet, it can be seen that the presence of any ferromagnetic material outside of the sensing head has virtually no effect on the functioning of the speed sensor head. Because of the shielding effect of the housing, it can be seen therefore that the speed sensor head is small, compact, and can be positioned closely to the toothed exciter wheel.

Since the permanent magnet is a very thin disc, the stresses on the interface between the center post and the magnitude of vibration and thermal coefficients of expansion of the two materials is also minimized. The mechanical integrity of the center post flux return path and the primary magnet is therefore easily maintained thereby avoiding changes in the sensitivity of the device under conditions of vibration and high temperature.

FIG. 4 shows a typical demagnetization curve for a cobalt-samarium magnetic material and is useful in understanding the manner in which the system operates.

Demagnetization curve 20 shown in FIG. 4 is part of the hysteresis curve of the particular magnetic material and shows the relationship between the induction B in Gauss, plotted along the ordinate, and the magnetizing force H in oersteds, plotted along the abscissa. Demagnetization curve 20 has a residual induction value $B_R$ (residual induction is defined as the magnetic induction corresponding to zero magnetizing force in a given magnetic material, i.e., the induction left in the magnet when H goes to zero). The coercive force of the magnet, shown at $H_c$, is the magnetizing force required to reduce the induction to zero in magnetic material, i.e., 8000 oersteds for samarium cobalt. Once this magnetization force is removed, the magnetic induction springs back up the demagnetization curve 20 to some point which is a junction of the circuit permeability. For samarium cobalt magnet material, the magnetization force required to completely demagnetize the magnet is some much higher level, following a so-called intrinsic demagnetization curve, not shown.

The actual speed sensor magnetic circuit operating points X and Y are dependent on the wheel position since this cyclically varies the air gap. That is, the air gap is small when a tooth on the wheel is directly in front of the permanent magnet and as a result, the reluctance of the magnetic path is low. When the lands between the teeth are in front of the magnet, the air gap and path reluctance is increased and the permeability is decreased. Points X and Y are defined by the intersection of the load lines 21 and 22 with the demagnetization curve. Load line 21 represents the operating condition of the sensor head and the exciter wheel with a tooth positioned directly in front of the permanent magnet, i.e., a very small air gap and low reluctance, and load line 22 represents the operating conditions with the permanent magnet facing the areas between the teeth, i.e., to a very large air gap and hence, a very high reluctance path. The actual slopes of the individual load lines and hence the actual operating points and values of induction B are determined not only by the dimension of the air gap but also by such items as the length and diameter of the magnet and the magnetic permeability of the remainder of the path including leakage.

As exciter wheel 15 rotates, the thin permanent magnet 6 initially encounters a relatively low reluctance path when tooth 16 is directly opposite the magnet and produces a flux or induction level $B_x$ equivalent to the operating point X on the curve as represented by load line 21. As the tooth 16 rotates away, reluctance increases, since the air path is now substantially longer. The operating conditions are now represented load line 22 and the operating point is point Y on curve and produces a flux or induction level equivalent to $B_y$. Since this changing flux level is coupled through center post 5, an AC signal is generated in coil 10 which has a frequency directly proportional to the exciter wheel speed.

The objective, of course, is to obtain a useful output signal having a peak-to-peak amplitude sufficiently large for easy sensing and signal processing, while at the same time, minimizing the size of the permanent magnet and the associated magnetic path in order to permit the manufacture of a small, compact sensor head. By utilizing the construction herein and shown in FIGS. 1 through 3, i.e., with a rare earth magnet positioned directly adjacent to the exciter teeth and an integral magnetic return path which shields the magnet, it has been found that a very small and compact device may be constructed which functions accurately and effectively.

A sensor head as shown in FIGS. 1 through 3 was constructed using a cup shaped housing of low carbon cold rolled steel which was one (1.0) inch long with an outer diameter of 0.70 inches. A disc shaped, cobalt-samarium, permanent magnet, having a diameter (D) of 0.150 inches and a thickness (L) of 0.050 inches was cemented to the end of the center post and a coil comprising 4600 turns of 0.004 inch diameter wire was wound on a bobbin and positioned on the center post. The air gap between the exciter wheel teeth and the permanent magnet was set at 0.044 inches and a 3 inch diameter wheel having teeth was rotated at 1400 rpm and the voltage induced in the coil was measured to determine whether a sensor of this size would produce a signal of sufficient amplitude to be useful in a speed measuring system. In running the wheel at 1400 rpm and with the device constructed as described above, the output signal from the coil was a generally sinusoidal voltage having peak-to-peak value of 3.0 volts. This showed that a sensor one inch long and less than ¾ inch in diameter utilizing a magnet 0.150 inches in diameter and .05 inches thick produced a more than adequate output signal for use in a speed sensing system. It can be seen, therefore, that this integral magnetic circuit construction utilizing a rare earth, samarium-cobalt magnet positioned directly adjacent to rotating means, provides a small, compact, sensing head for a variable reluctance speed sensing device.

In the preferred embodiment illustrated in FIGS. 1 through 3, the sensing head is shown with a cylindrical or cup shaped housing having a center post extending into the middle thereof. The instant invention is however, not limited to such a cylindrical shape since it will function equally well even though the outer walls are not cylindrical. That is, the housing may be of a configuration in which there are two rectangular outer walls, base and a coil and magnet supporting center post section extending between the two outer walls. In this arrangement while there is a little end leakage, the outer walls provide the flux return path and still effectively shield the permanent magnet from external magnetic effects, while yet permitting an integral construction which is compact and small.

One specific variation involves the use of two sensor elements, side-by-side, in one head assembly for dual output where it is highly desirable to minimize mutual coupling. This design problem is easily solved using the sensor approach described herein because of its inherent shielding qualities.

While a particular embodiment of the invention has been illustrated and described, it will be apparent that various modifications thereof may obviously be made both in the various instrumentalities and in the arrangement described without departing from the true spirit and scope of the invention as defined in appended claims.

What is claimed as new and desired to be secured by Letters Patent of the United States is:

1. A variable reluctance speed sensing device for measuring the speed of a moving element including, in combination:
   a. a thin, disc shaped, rare earth permanent magnet of thickness L and diameter D for producing magnetic flux for passage through a moving member,
   b. an integral housing formed of a ferromagnetic material to provide a return path for the magnetic flux, comprising:

1. wall means to provide a return flux path for the flux from said magnet after passage through a moving element,
2. a base member connecting said wall means,
3. a core member extending from said base and positioned re-entrantly within said wall means for supporting said magnet at the free end thereof whereby said magnet may be positioned directly adjacent to a moving member to establish a flux path from said magnet across an air gap to a moving member and back through said housing; said re-entrant core member being positioned within said walls to shield said core and said magnet from external magnetic effects,
4. a sensing coil supported on said core member for producing a signal due to flux variations in said housing and said core due to a moving member.

2. The variable reluctance speed sensing device of claim 1 wherein said magnet is a samarium-cobalt or other high coercive force magnet, and the ratio of L/D of said magnet is no greater than ⅛.

3. The variable reluctance speed sensing device according to claim 1 wherein said wall means completely surround said core member.

4. A variable reluctance speed sensing device according to claim 3 wherein said integral housing is cup shaped and said wall means is of a cylindrical configuration.

5. A variable reluctance speed sensing system including:
   a. a thin, disc shaped, rate earth permanent magnet of thickness L and diameter D for producing magnetic flux.
   b. a moving member having protuberances to vary the air gap relative to said magnet whereby the reluctance of the associated magnetic path and the magnetic induction in said path is varied,
   c. an integral housing for said magnet formed of a ferromagnetic material to provide a magnetic flux return path for the flux from said magnet and said moving member comprising:
      1. wall means to provide a return flux path for the flux from said magnet after passage through said moving member;
      2. a base member connecting said wall means,
      3. a core member extending from said base and positioned re-entrantly within said wall means for supporting said magnet at its free end whereby said magnet is positioned directly adjacent to said moving member to establish a flux path from said magnet across an air gap to said moving member and back, the said air gap being varied as the member rotates and the protuberances move by said magnet, said re-entrant core member being positioned within said wall means to shield said core and said magnet from external magnetic effects.
      4. a sensing coil supported on said core for producing a signal voltage therein due to flux variations produced by said moving member.

6. A variable reluctance speed sensing system according to claim 5 wherein said magnet is a samarium cobalt or high coercive force magnet and the ratio of L/D is no greater than ⅛.

7. The variable reluctance speed sensing system according to claim 5 wherein said wall means completely surround said core means to shield said core from the action of external magnetic effects.

8. The variable reluctance speed sensing system according to claim 7 wherein said integral housing is cup shaped, then said wall means is of a cylindrical configuration.

9. A variable reluctance speed sensing system according to claim 8 wherein said moving member comprises a wheel having a plurality of teeth.

* * * * *